Figure 6:
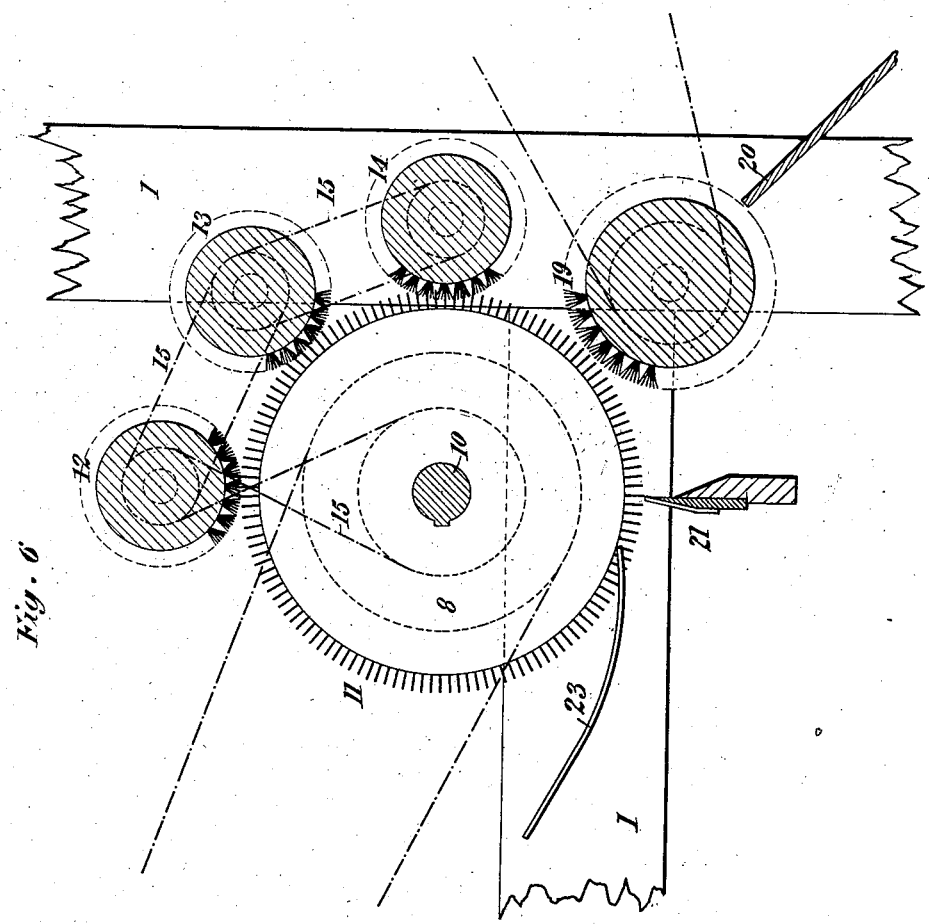

(No Model.) 3 Sheets—Sheet 1.
G. C. LA DUE.
MECHANISM FOR SEEDING FRUIT.
No. 543,834. Patented July 30, 1895.
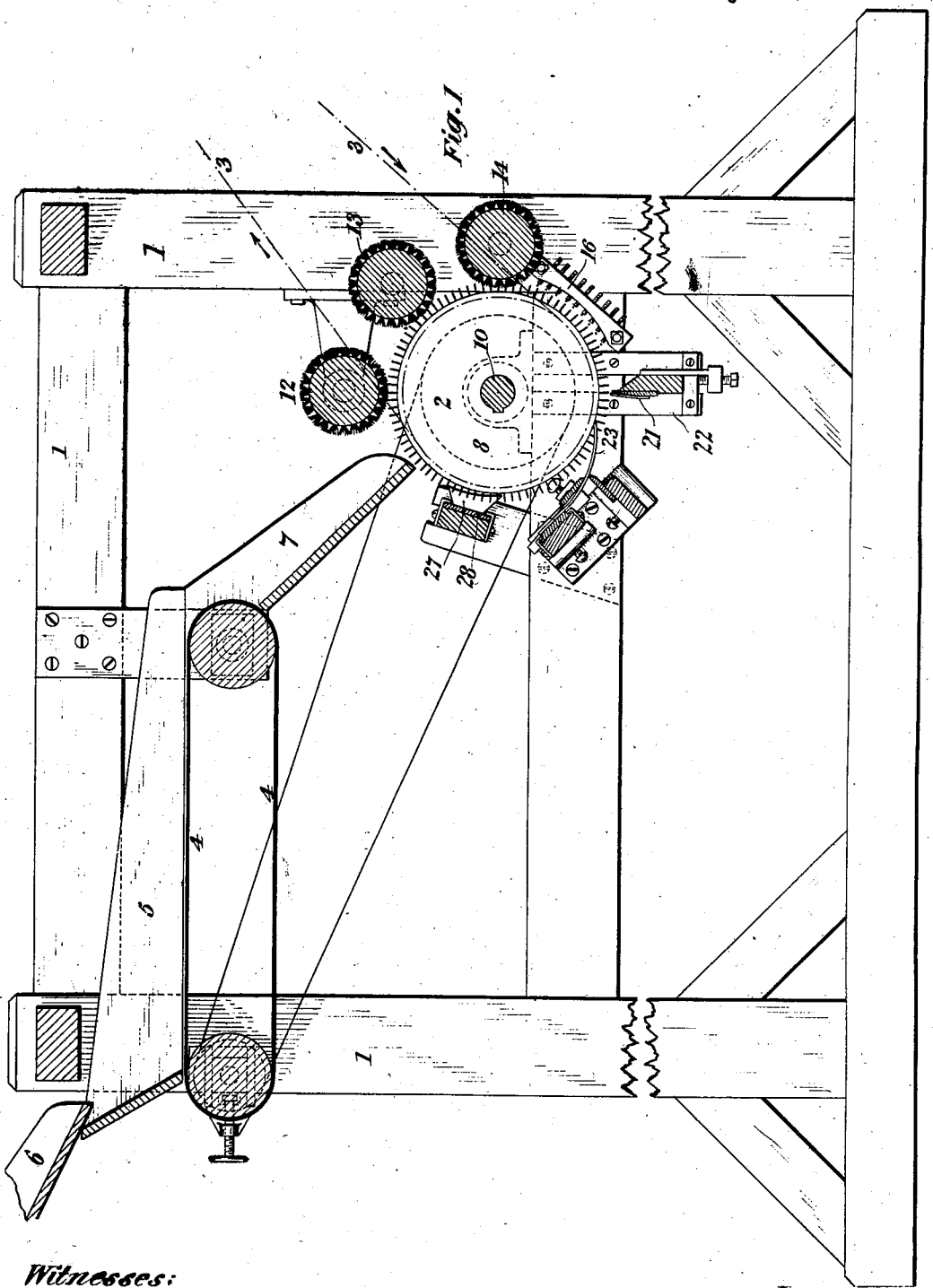
Witnesses:
Robt. F. Gaylord
Jameson Catlow
Inventor
George C. La Due
by Duncan & Page, Attorneys (No Model.)　　　　　　　　　　　　　　　3 Sheets—Sheet 2.
G. C. LA DUE.
MECHANISM FOR SEEDING FRUIT.
No. 543,834.　　　　　　　　　　Patented July 30, 1895.
Fig. 3
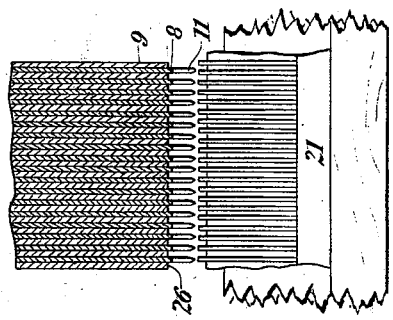
Fig. 2
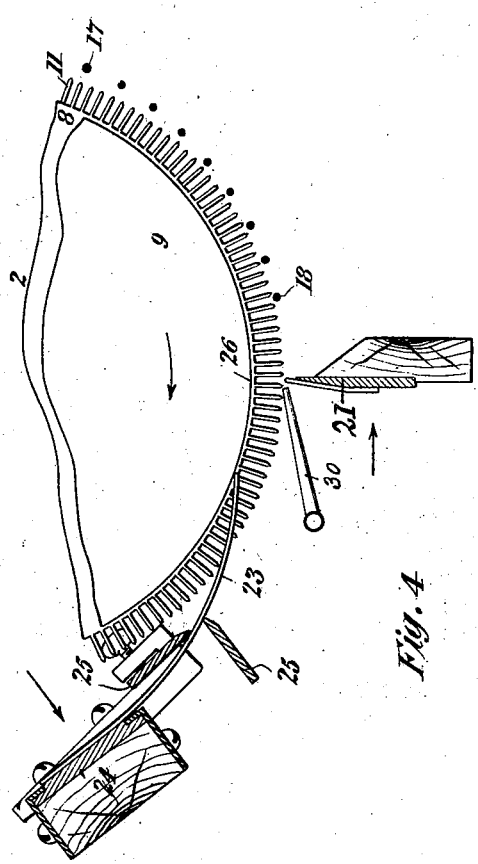
Fig. 4
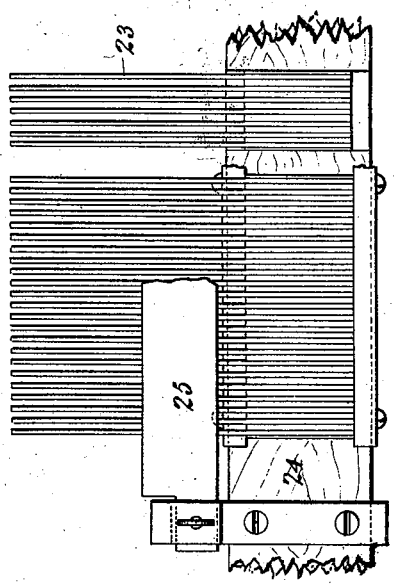
Witnesses:
Robt F Gaylord
James N Catlow
Inventor:
George C La Due
by Duncan Page
Attorneys.

(No Model.)  
G. C. LA DUE.  
MECHANISM FOR SEEDING FRUIT.

No. 543,834.  
Patented July 30, 1895.

3 Sheets—Sheet 3.

Witnesses:  
Robt. F. Gaylord  
James N. Catlow

Inventor  
George C. La Due,  
by Duncan & Page,  
Attorneys.

UNITED STATES PATENT OFFICE.

GEORGE C. LA DUE, OF BROOKLYN, NEW YORK, ASSIGNOR TO THE FRUIT CLEANING CO., OF SAME PLACE.

MECHANISM FOR SEEDING FRUIT.

SPECIFICATION forming part of Letters Patent No. 543,834, dated July 30, 1895.

Application filed May 23, 1895. Serial No. 550,381. (No model.)

*To all whom it may concern:*

Be it known that I, GEORGE C. LA DUE, a citizen of the United States, residing at Brooklyn, in the county of Kings and State of New York, have invented certain new and useful Improvements in Mechanism for Seeding Fruit, reference being had to the drawings accompanying the following specification and forming a part of the same.

The present invention relates to mechanism for removing the seed of fruit from the pulp or body thereof, especially dried fruit, such as raisins, currants, &c., one form of mechanism for carrying out the invention being hereinafter set forth as the same is adapted to seeding raisins.

I am aware that it has been heretofore proposed to expel or remove the seed from raisins by various forms of mechanisms, which, in essential respect, act to force the raisins upon teeth separated by spaces less than the thickness of the seeds to be excluded and by such impaling action expel the seed from the pulp of the raisins, and to remove the seeded fruit from the seeding-teeth by the action of blade-like strippers. Such devices are ineffectual for seeding fruit in commercial quantities and without wasting the substance of or unduly rupturing or tearing the fruit.

In seeding raisins mechanically in practical quantities, and by impaling the same on a surface of points or teeth, and with the purpose of not destroying the natural form of the fruit and of not wasting the pulp of the fruit, the following conditions have to be considered: If the impaling-points are sufficiently slender to not unduly rupture or tear the raisins, nor force therefrom the pulp thereof, then by reason of the toughness of the skin it is not practicable to force the raisins upon the impaling-points by a single action, so as to at the same time drive the seeds from the fruit without injuring the impaling-teeth. If the impaling-teeth be sufficiently strong to sustain a single impaling and seed-removing action, then they would be so large as to undersirably rupture and force out much of the pulp of the fruit, and the force of such action would have to be in excess of the resistance of the seeds and would crush them, which would spoil the fruit for commercial and consumption purposes.

The essential features of operation of my mechanism consist in first partially impaling the raisins upon the pointed or toothed surface, or so that the teeth will only perforate one side or through the skin on one side of the fruit and engage and force the seeds to contact with the skin on the opposite side of the fruit, and in then puncturing or rupturing the skin over the seed and pressing the same and the underlying pulp farther upon the impaling-teeth, the actions of impaling the fruit, opening the same, and forcing the seed therefrom being separately effected in contradistinction to the action of a roll which forces the fruit upon the teeth and expresses the seed by a single pressure.

Another difficulty heretofore experienced in seeding raisins in commercial quantities is that the gummy pulp of the raisins adheres to the working parts of the machine and rapidly clogs and prevents the same from properly acting. This clogging takes place particularly on the impaling-teeth and on the devices which strip or remove the fruit from the impaling-teeth, which latter as heretofore employed act to increase this difficulty in that they have consisted of blades or devices of extended or plane surfaces adapted to collect the gum and bind the stripped raisins together into clogging masses, whereas it is desirable that the raisins be singly stripped and fall away from the impaling-surface without adhering together. My improvement in this regard relates to the use of stripping-wires in contradistinction to blades or fingers, and in supporting said wires in such manner that they may be readily removed and substituted by other like wires while one set of stripping-wires is being cleansed.

It is essential that the raisins be delivered singly, or not in masses, to the impaling-surface, in order that they shall not overlie one another when submitted to the impaling action, and to this end I provide means whereby the raisins are dropped upon such surface and kept agitated or in motion, so as to be separated if clinging together and caused to feed singly to the impaling device. It is also highly essential that the impaling-teeth be kept clean of collections of gum or pulp, and to this end I provide cleaning-blades that lie in the grooves or between the teeth of the impaling-surface and collect whatever gum may pass the strippers, which cleaning-blades are mounted upon movable supports, so that one set thereof may be substituted by another while the former is being cleansed.

In the drawings accompanying this specification, Figure 1 is a central vertical longitudinal section of a machine embodying my improvements. Fig. 2 is an enlarged detailed cross-section of the fruit carrying or impaling roll, taken between the circular plates composing the same. Fig. 3 is a lengthwise detail section of said roll, looking from the left hand of Fig. 2. Fig. 4 is an enlarged detailed view of the fruit-stripping devices as viewed in the direction of the upper arrow of Fig. 2. Fig. 5 is a similar detail view of the carrier-roll-cleaning blades. Fig. 6 is an enlarged detailed section, similar to Fig. 1, of the carrying-roll, showing certain modifications to be hereinafter more fully described.

Referring to the views in detail, 1 represents the general framework of the machine.

2 represents as a whole the fruit-carrying roll or the surface upon which the fruit is impaled for the purpose of removing the seed therefrom. This roll is driven by belt 3 and it in turn drives the endless feeding-belt 4, which runs along the bottom of trough 5, into which the fruit is fed, as from the spout 6, 7 being a long spout inclined from the vertical, which delivers the fruit upon the carrier-roll. The belt 4 acts to agitate and separate the rsisins and to deliver the same singly or in a single layer to the delivery-trough 7, down which they fall upon the carrier-roll and are thereby separated, and the movement of the roll keeps them in motion, so that they will not stick together, but will be carried forward singly or in a single layer.

The carrier-roll 2 is composed of toothed plates 8, alternating with spacing-plates 9, which are properly bound together and fixed to the shaft of the roll 10, the roll being supported in suitable journals on the frame of the machine. The teeth 11 of the alternate plates of this roll are perfectly square in cross-section, and the length thereof is such as conforms to the thickness of the fruit to be operated upon, while the space between any two adjacent teeth is less than or at least does not exceed the average smaller diameter of the seed of the fruit.

12 is a removable brush-roll journaled in brackets or other like supports fixed to the machine, and which roll is the impaling-roll, or the one which forces the fruit upon the teeth of the carrier, the roll being so adjusted relatively to the fruit-carrier surface and the character of its surface of fiber, bristles, or other yielding substance being such that the fruit is impaled upon the teeth without being at least to any essential extent ruptured by the action of the roll. 13 is a similar roll similarly mounted, but adjusted somewhat nearer to the carrier-surface, and the bristles or operative surface of this roll may be stiffer or less yielding than that of the roll 12. The function of this roll is to perforate the skin of the fruit lying over the seeds of the impaled fruit, preliminary to the unimpaled portion of the fruit being pushed from off the seeds. 14 is a similar roll similarly supported on the frame, the brush or yielding surface of which is adapted to engage the perforated skin of the fruit and press the same down upon the main body of the fruit, thus leaving the seeds upon points of the carrier-surface, but stripped of the skin and pulp of the fruit. These rolls are driven by contact with the surface of the carrier-roll, or they may be driven by belting—such, for example, as is seen at 15 in Fig. 6. Their peripheral speed, however, should be the same as that of the surface of the carrier-roll.

16 indicates a frame and a series of longitudinal wires carried thereby under tension and located at different distances, or at distances whereby the first wire 17 (see Fig. 2) is at a distance from the carrier-surface somewhat less than the average thickness of the fruit-seed, while the intermediate wires are set successively slightly closer to the surface of the carrier-roll, the last wire 18 just escaping the points of the carrier-teeth. The purpose of these wires is to remove the seeds which have been excluded from the fruit impaled upon the carrier-surface. As the seeds roll under and out from or are brushed off by these wires the wires are caused to vibrate and thereby further assist in moving the seeds by their vibrating or flicking action, and at the same time prevent undesirable accumulation of gum upon the same. In lieu of the use of such wires a rapidly-revolving roll, such as the brush-roll 19 of Fig. 6, may be employed, and which has a peripheral speed considerably greater than that of the speed of the carrier-roll. Other like or similar acting devices may be used for removing the excluded seed from the impaling-points, the desirable action of such device being that of a flicking or whisking nature. In the use of such a roll or like device, a guard or cleaner 20 may be employed, the purpose of which is to restrain and confine the flying seed as well as to remove the same from contact with the seed-removing roll. To insure the removing of the seed from the carrier-surface that may pass the last wire 18, a comb 21 is provided, the teeth of which just clear the points of the teeth of the carrier-surface.

If it be desired the wires 17 and 18 may be omitted and the comb alone used, but preferably with an air-blast nozzle 30, which is located to direct a jet of air under pressure to between the points of the comb and the impaling-surface, whereby the seeds will be blown off. In the case of the use of an air-jet the comb may be omitted, or it may be employed with one or more of the wires 17 18, or the wires alone be used, the comb or the wires or both acting to loosen the seed and the jet acting to remove them. This comb is mounted in removable supports 22, so that it can be taken from the machine and cleaned at any time when needed and another put in its place.

23 indicates a series of fruit-stripping wires which are secured to the cross-beam 24, removably mounted in the frame. Adjustable bearing-blades 25 are provided, whereby the wires are brought to a common plane and the desired pressure of the same upon the carrier-roll is effected. Preferably these wires are slightly curved, as shown; but in substantial effect they are arranged tangentially to the carrier. The points of the wires rest in grooves 26 between the toothed plates 8 of the carrier-roll and upon the edges of the spacing-plates 9, the spacing-plates being of smaller diameter than is the circle of the bottom of the spaces between the teeth of the toothed plates, and preferably the thickness of the points of these wires is not in excess of the depth of the grooves so formed, whereby it is insured that the points of the fingers will be beneath the fruit when the same reach the fingers as the carrier rotates. The function of these wires is to strip the seeded fruit from the carrier-teeth. It is essential to this stripping action that the fingers bear stiffly on the carrier, so as to not have any vibratory or relative movement, and be composed of long slender wires in contradistinction to blades or plates.

27 indicates a series of scraping or cleaning blades mounted on the bar 28, removably supported on the frame of the machine. These plates are of the general segmental form shown in Fig. 5, and their curved or working edges 29 lie in the grooves 26 and in contact, or very nearly so, with the edges of the spacing-plates 9 of the carrier-roll, the thickness of these scrapers being practically that of the said spacing-plates. The function of these plates is to scrape off any gum that may collect in the grooves 26 or on the groove sides of the teeth of the carrier.

The action of the mechanism will now be understood. If raisins are being operated on, for example, they are broken up and separated and singly delivered upon the carrier-roll by the feeding devices. As the raisins come under the impaling-roll they are slightly pressed upon the teeth of the carrier and their seeds are engaged by such teeth and brought against the skin of the fruit. When the raisins thus impaled come under the puncturing-roll, the bristles or pointed surface of the same puncture the skin over the seeds and start or slightly remove the same from off the seed; but this roll is not intended to further impale the fruit upon the carrier, although such action may to a slight extent occur. The main purpose of this roll is to puncture the skin over the seeds preparatory to its being pushed off and down upon the body of the fruit. When the raisins reach the third or final impaling-roll, the seeds are free to be removed, except that the skin and pulp of the fruit still adhere to the sides of the seeds, and the action of this roll is to strip the skin and the pulp from the seed and press the same down upon the main body of the fruit, thus further and finally impaling the fruit upon the carrier-teeth, the fruit being brought to or below the points of the surface of the impaling-roll. After the raisins have left this roll the seeds will be found holding to the points of the carrier-surface by the gum or pulp, but fully expressed or excluded from the bodies of the raisins. The further action is that of removing the seeds by the seed-removing devices, as already explained. Either one of these rolls may, to some extent, have an action similar to that of one of the others. The seed may be so massed in the fruit that the impaling-roll may cause one or more of them to break through the skin, and the puncturing-roll may act to remove some of the seeds which have been thus forced out, and in like manner the final impaling-roll may dislodge a few of the most easily-removable seeds; but it is to be understood that these actions are incidental to the main actions of the rolls. It is possible, and I have practiced the use of only one roll for the purpose of puncturing the skin of the impaled fruit and stripping the pulp and skin from the seed; but this is not so practicable as is the use of two separate rolls. When the seeded raisins reach the stripping-wires they are gradually lifted or slid along the impaling-teeth and stripped therefrom.

In spite of precautions, the various parts of the machine will gradually become gummed and clogged. To reduce this difficulty to a minimum, all the parts, except the main or carrying roll, are made removable, so that duplicate parts can be inserted. Limiting the effects of gumming is one of the essentials to successfully seeding fruit in commercial quantities, especially as concerns the stripping-wires, it being particularly required that these devices be kept as free as possible from gum, so that the raisins in stripping off from the carrier will be singly or separately dropped.

The impaling, puncturing, and final impaling rolls may be substituted by mechanism operating in similar manner (and constituting in effect separate surfaces acting successively upon the fruit) with the impaling-surface to preliminarily impale the fruit and force the seeds against the skin of the same opposite the impaling side, and to force the ruptured skin and pulp beneath the same down upon or further impale the fruit, so as to exclude the seeds from the fruit.

What is claimed as new is—

1. In combination in a machine for seeding fruit, a carrier for conveying the fruit which is provided with a series of points or teeth spaced to engage the seed of the fruit, a pressure mechanism the surface of which moves to and from the carrier and acts to partially impale the fruit upon the carrier, and a puncturing mechanism the surface of which moves to and from said impaling surface and acts subsequently to the action of said impaling mechanism to porforate the skin over the seeds of the impaled fruit for the purpose of uncovering the seed of the fruit.

2. In combination in a machine for seeding fruit, a carrier for conveying the fruit which is provided with a series of points or teeth spaced to engage the seed of the fruit, pressure mechanism having motion angularly with relation to the carrier and acting to partially impale the fruit upon the carrier and by further action to puncture or rupture the skin over the seeds of the impaled fruit to free the seed preliminarily to removing the same from the body of the fruit.

3. In combination in a machine for seeding fruit, a roll for receiving and conveying the fruit the surface of which is provided with a series of points or teeth spaced to exclude the seeds of fruit impaled thereon, a pressure roll acting to partially impale the fruit on the carrier teeth so that they engage the seed preliminarily to removing the same from the pulp, and a brush roll acting to rupture the skin of the fruit lying on and to force the same off the seed, substantially as set forth.

4. In combination in a machine for seeding fruit, a carrier roll provided with a series of points or teeth spaced to exclude the seed of the fruit, a roll acting to partially impale the fruit on the carrier so that its teeth engage the seed, a roll acting to puncture or rupture the skin of the fruit lying on the seed, and a roll acting to force the punctured skin and pulp of the fruit from around the exposed seed, substantially as set forth.

5. In combination in a machine for seeding fruit, a carrier roll provided with a series of teeth spaced to engage and exclude the seeds of fruit impaled thereon, and a series of two or more rolls adjusted at different distances from said carrier and successively acting to partially impale the fruit on the carrier teeth and rupture and displace the skin of the fruit lying over the seed preparatory to removing the seed, substantially as set forth.

6. In combination in a machine for seeding fruit a carrier provided with teeth spaced to engage the seed of the fruit when impaled upon said teeth, a roll acting to partially impale the fruit upon the said carrier, a roll acting to perforate the skin of the fruit over the seeds thereof, and a series of stripping wires 23 located between the teeth and acting to lift from the teeth the fruit impaled thereon.

7. In combination in a machine for seeding fruit, a carrier for conveying the fruit composed of a series of spaced teeth, a series of two or more rolls acting to impale the fruit upon the teeth and exclude the seeds therefrom, and a series of cleaning blades located in the circumferential spaces between the teeth and acting to remove therefrom collections of pulp or gum, substantially as set forth.

8. In combination in a machine for seeding fruit, a carrier for conveying the fruit composed of a series of spaced projections, pressure mechanism acting to press the fruit upon the carrier, puncturing mechanism acting independently of the pressure mechanism to open the fruit and expose the seeds thereof, and seed removing mechanism operating to detach the seed from the said carrier.

9. In combination with the toothed carrier, pressure mechanism acting to impale the fruit upon the carrier and exclude the seeds therefrom, and a wire or wires arranged parallel to the surface of the carrier and acting to loosen the seeds thereon, and a comb 21 acting to engage the loosened seeds and detach the same from the carrier.

10. In combination with the toothed carrier, pressure mechanism acting to impale the fruit upon the carrier and exclude the seeds therefrom, mechanism such as comb 21 arranged parallel to the surface of the carrier for engaging the excluded seeds, and an air jet or nozzle 30 located to direct a blast of air against the surface of the carrier for the purpose of removing the excluded seeds.

11. In combination in a machine for seeding fruit, a carrier for receiving and conveying the fruit, provided with a series of spaced teeth, pressure mechanism acting to preliminarily or partially impale the fruit upon the teeth and rupture the skin over the seed so as to exclude the same from the fruit, mechanism acting to dislodge or remove the seed from the carrier, a series of stripping wires 23 acting to remove the seeded fruit from the teeth of the carrier, and a series of blades located in circumferential spaces between the teeth and acting to remove therefrom collections of pulp or gum, as set forth.

GEORGE C. LA DUE.

Witnesses:
ROBT. F. GAYLORD,
JAMES N. CATLOW.